Nov. 2, 1937.  H. HEINE  2,097,762

MICROSCOPE

Filed May 23, 1934

INVENTOR
Hermann Heine
BY
ATTORNEY

Patented Nov. 2, 1937.

2,097,762

UNITED STATES PATENT OFFICE 2,097,762

MICROSCOPE

Hermann Heine, Wetzlar, Germany, assignor to Ernst Leitz, Optische Werke, Wetzlar, Germany Application May 23, 1934, Serial No. 727,052
In Germany May 26, 1933

1 Claim. (Cl. 88—40)

This invention relates to improvements in microscopes, particularly microscopes combined with a polarizer and an analyzer, and it is the principal object of my invention to provide means for guiding the light rays, by means of an annular mirror within the microscope tube, on the outside of the objective from above upon the object, and the source of light is arranged laterally to the microscope, while between the source of light and the annular mirror a polarizer is intercalated which may either form an integral part of the system or may be independent therefrom.

Another object of my invention is the provision of a microscope with a movable analyzer which however is stationary with respect to the illuminating arrangement, and independent from the microscope tube and the rotation of the optical part of the illuminator, while removably secured to the carrier of the optical illuminating system.

A further object of my invention is the provision of a microscope equipped with an exchangeable gypsum plate which may either be rotatable or stationary within the tube of the illuminator arrangement which besides this plate contains also a filter disc and a sector-shaped shutter whereby a spring secures the gypsum plate, the filter disc and the sector shutter in place.

A still further object of my invention is the provision of a microscope of the above described type equipped with a holder for the gypsum plate which is arranged in a groove of its carrier member while said holder has a lateral cut away portion allowing a ready gripping and operation of the filter disc and sector shutter.

These and other objects and advantages of my invention will become more fully known as the description thereof proceeds and will then be specifically defined in the appended claim.

In the accompanying drawing forming a material part of this disclosure:

Figure 1:
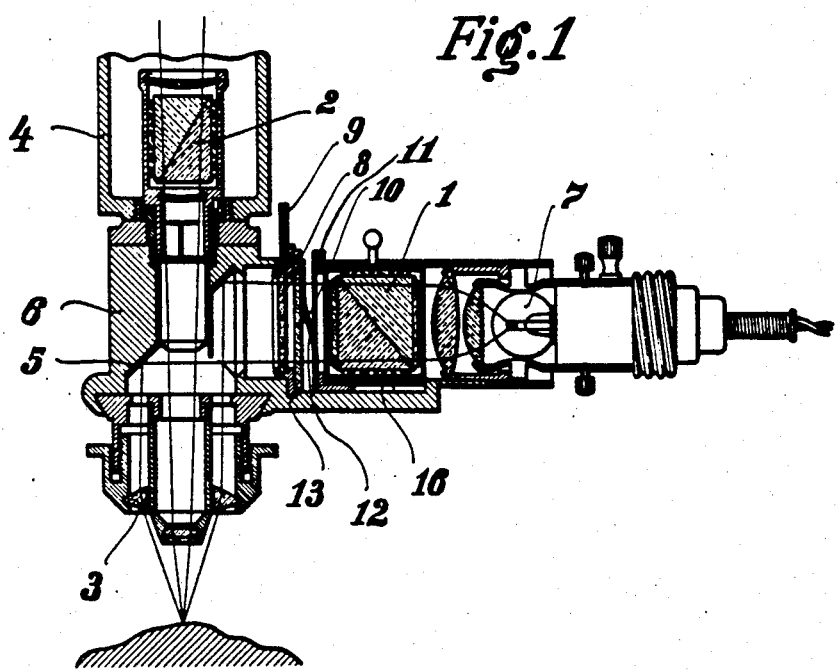
Figure 1 is a sectional front elevation of a microscope system constructed according to my invention.
Figure 3:
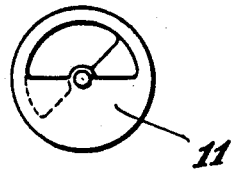
Fig. 3 is a detail view of a sector shutter.
Figure 2:
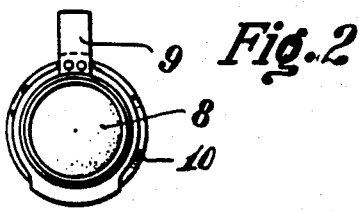
Fig. 2 is a detail of the holder assembly.

As illustrated, a microscope including its tube 4 has movably and independently arranged therein an analyzer 2 which is removably attached to the carrier 6 for the illuminating system which carries an annular mirror 5 for reflecting the light rays from a source of light 7 through a ring condenser 3 guiding the light rays on the outside of the objective from above onto the object to be observed.

The source of light is laterally arranged to the microscope within a suitable holder member within which a polarizer 1 is provided which may either form an integral part of the system or be constructed independently therefrom and thus be made exchangeable.

The polarizer 1 is hinged as at 16 to the holder.

A gypsum plate 8 is exchangeably arranged within its holder 9 in the holder for the illuminating source in front of the polarizer or may be stationary in its frame.

Between polarizer and the gypsum plate 8 is arranged within the holder member a filter disc 10 and a sector diaphragm 11 and plate 8 as well as disc 10 and diaphragm 11 are held in position by means of a spring 12, while the holder for the gypsum plate is engaged in a groove 13 of the holder member.

A lateral part of the holder 9 for the gypsum plate is cut away to enable a convenient gripping and operation of the sector diaphragm and filter disc.

The operation of my device will be entirely clear from the above description by simultaneous reference to the drawing.

It will be understood that I have disclosed the preferred form of my microscope system as one example only of the many possible ways to practically construct the same and that I may make such changes in its general arrangement and in the construction of its minor details as come within the scope of the appended claim without departure from the spirit of my invention and the principles involved.

Having thus described my invention what I claim as new and desire to secure by Letters Patent is:

In a microscope system of the class described including an annular mirror, an illuminator carrier having an inner groove and a recess, a polarizer between said illuminator carrier and said annular mirror, said annular mirror directing the light rays of the illuminator in said carrier reflected therein from above onto the object to be observed through the microscope, a holder engaged in the groove of said carrier, a gypsum plate exchangeably held in said holder in front of said polarizer, a filter disc in said carrier between said polarizer and said gypsum plate, and a sector diaphragm in the recess of said carrier in front of said polarizer spaced from said filter disc, and a spring in the space between said diaphragm and filter disc engaging both to hold the same in place for ready detachment or insertion and convenient adjustment.

HERMANN HEINE.